US012233425B1

(12) United States Patent
Dillon

(10) Patent No.: US 12,233,425 B1
(45) Date of Patent: *Feb. 25, 2025

(54) MOBILE TRASH COMPACTOR AND PULVERIZER

(71) Applicant: Daniel L. Dillon, St. Louis, MO (US)

(72) Inventor: Daniel L. Dillon, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,696

(22) Filed: Nov. 3, 2023

Related U.S. Application Data

(62) Division of application No. 17/588,988, filed on Jan. 31, 2022, now Pat. No. 11,839,880.

(60) Provisional application No. 63/143,337, filed on Jan. 29, 2021.

(51) Int. Cl.

*B02C 18/28* (2006.01)
*B02C 18/00* (2006.01)
*B02C 18/18* (2006.01)
*B02C 18/24* (2006.01)

(52) U.S. Cl.

CPC .......... *B02C 18/28* (2013.01); *B02C 18/0092* (2013.01); *B02C 18/18* (2013.01)

(58) Field of Classification Search

CPC ..... B02C 18/28; B02C 18/0092; B02C 18/18; B30B 3/04; B30B 3/00; B30B 9/32; B30B 9/3082

See application file for complete search history.

(56) References Cited

FOREIGN PATENT DOCUMENTS

| | | | | |
|---|---|---|---|---|
| DE | 202011000241 U1 * | 7/2011 | ........... | B30B 9/3082 |
| EP | 2808161 A1 * | 12/2014 | ........... | B30B 9/3082 |

OTHER PUBLICATIONS

English translate (EP2808161A1), retrieved date May 5, 2024.*
English translate (DE202011000241U1), retrieved date May 5, 2024.*

* cited by examiner

*Primary Examiner* — Mohammed S. Alawadi
(74) *Attorney, Agent, or Firm* — Grace J. Fishel

(57) ABSTRACT

A mobile trash compactor and pulverizer with a light weight compaction roller. The compaction roller has support discs in which a main shaft is supported and between which is mounted an over shaft concentric with the main shaft. An inner drum is mounted on the over shaft and flanking outer drums are mounted on the main shaft with drum support rings. A disc wheel mounted on a disc support ring caps the ends of the main shaft. A reversible drive is attached to the main shaft and another independent reversible drive is attached to the over shaft. The support discs, drum support rings and disc support rings have a rim, spokes and a hub with apertures between the spokes that facilitate maintenance.

15 Claims, 12 Drawing Sheets

MOBILE TRASH COMPACTOR AND PULVERIZER

BACKGROUND OF THE INVENTION

Field of the Invention

The present invention relates to a trash compactor and pulverizer having a compaction roller with a plurality of independently driven sections, said compactor and pulverizer adapted to be mounted on a self-propelled vehicle with a hydraulic system and a boom capable of exerting a downward vertical force.

Brief Description of the Prior Art

Open top containers are used to receive various types of waste or trash including building materials. A major cost factor in waste disposal is the expense of transporting the container back and forth between the collection site and a waste disposal site. There are compactors with a compaction roller that is moved to-and-fro over the waste to reduce its volumetric capacity. By reducing the volume, more waste and trash may be put into the container before it is hauled to a remote waste disposal or landfill site. The prior art compaction rollers are typically attached to loading docks for servicing one container or mounted on tracks for servicing multiple containers set in a row but such equipment is not adapted for field use. In addition existing compaction rollers that are mobile are very heavy (e.g., 3000 or more lbs) as compaction depends solely on the weight of the roller and they do not effectively shred the waste or trash because they cannot control the position of the roller in the middle of the container which limits the amount of volumetric reduction possible.

BRIEF SUMMARY OF THE INVENTION

In view of the above, it is an object of the present invention to provide a compaction roller adapted to be mounted on a self-propelled vehicle capable of applying a downward force on the roller thereby reducing the weight requirement for the compaction roller. It is another object to provide a compaction roller with independently driven sections adapted to be driven off the hydraulic system of the vehicle for effective shredding of the waste and better compaction. Other objects and features of the invention will be in part apparent and in part pointed out hereinafter.

In accordance with the invention, a trash compactor and pulverizer has a compaction roller adapted to be supported from a plate mounted on a boom of a self-propelled vehicle capable of exerting a downward force on the roller. The roller has a horizontal axis on which are mounted a plurality of sections or drums, at least some of said sections independently rotated by reversible drives such that at least some of said sections may be rotated in opposite directions.

The invention summarized above comprises the constructions hereinafter described, the scope of the invention being indicated by the subjoined claims.

BRIEF DESCRIPTION OF THE SEVERAL VIEWS OF THE DRAWINGS

In the accompanying drawings, in which one of various possible embodiments of the invention is illustrated, corresponding reference characters refer to corresponding parts throughout the several views of the drawings in which.

DETAILED DESCRIPTION OF AT LEAST ONE PREFERRED EMBODIMENT OF THE INVENTION

Figure 12:
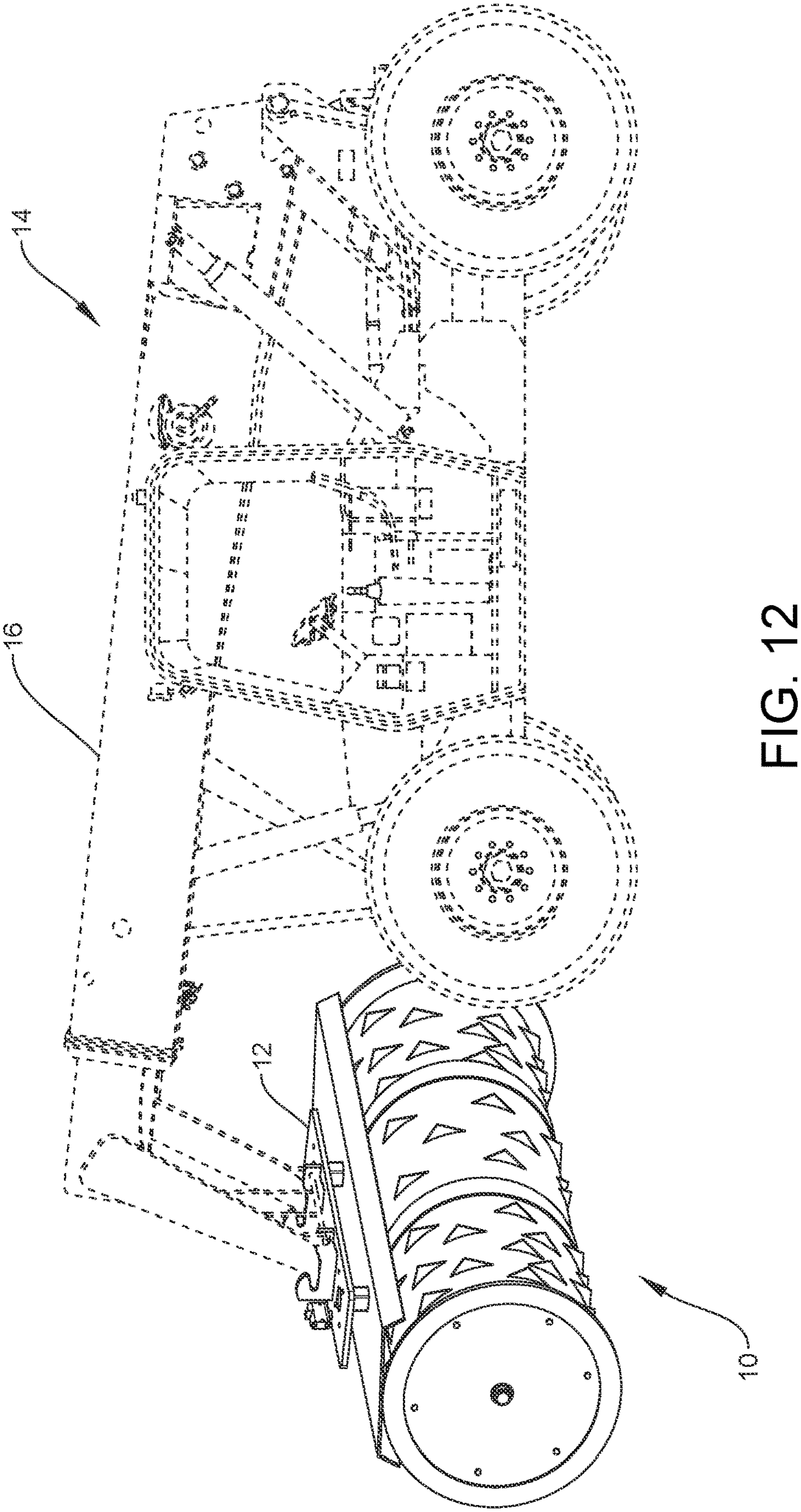
FIG. 12 is a view showing the trash compactor and pulverizer mounted on a self-propelled vehicle.

Referring to the drawings, beginning with FIGS. 1-4, reference number 10 identifies a trash compactor and pulverizer in accordance with the present invention. Compactor/pulverizer 10 includes a mounting plate 12 for attachment to a self-propelled vehicle 14 such as the telehandler shown in FIG. 12 with a boom 16 capable of exerting a downward force. In some cases, boom 16 may be telescoping as shown in FIG. 12 or articulated. Other suitable self-propelled vehicles include but are not limited to track hoes and Gradall excavators.

Figure 1:
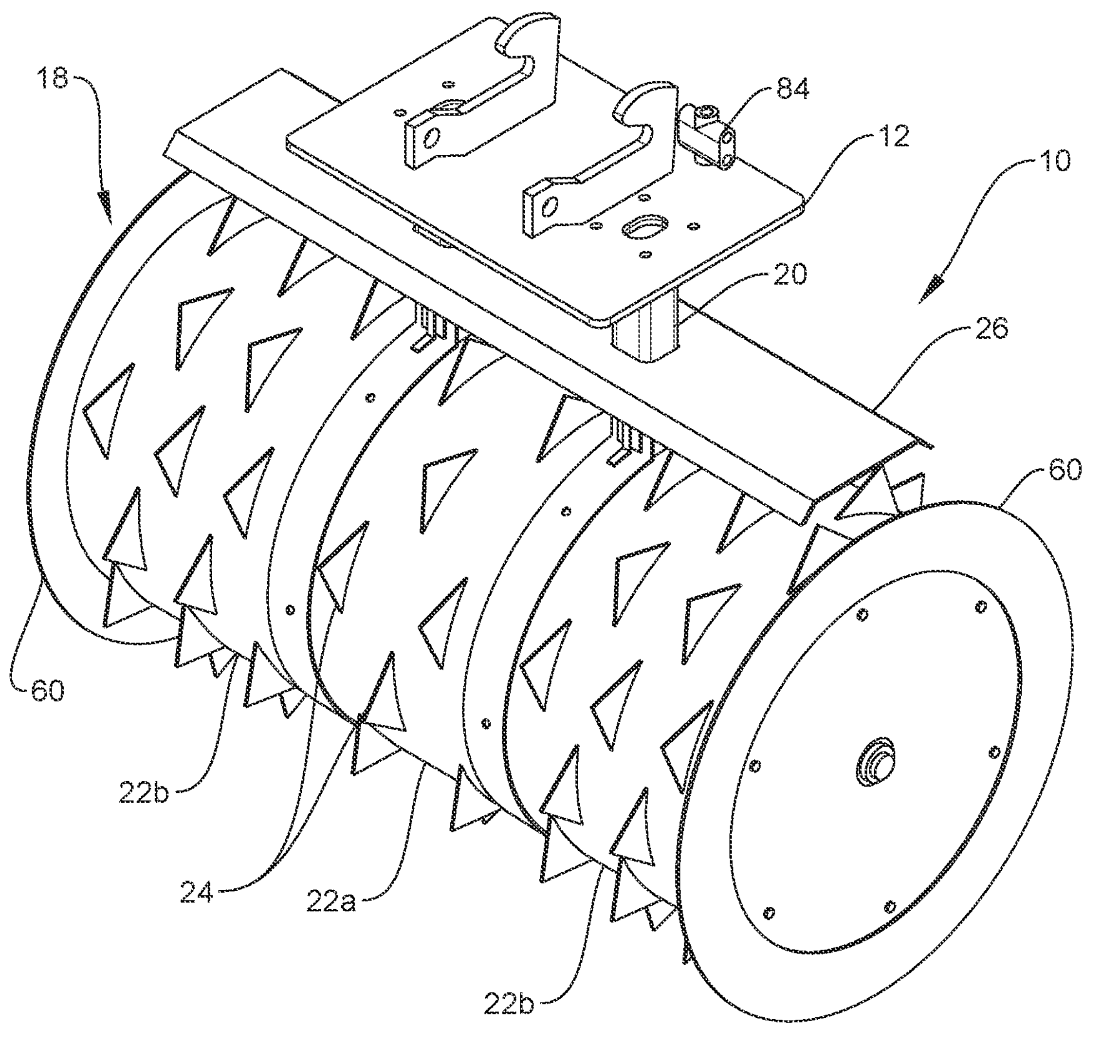
FIG. 1 is a perspective view of a trash compactor and pulverizer in accordance with the present invention.
Figure 2:
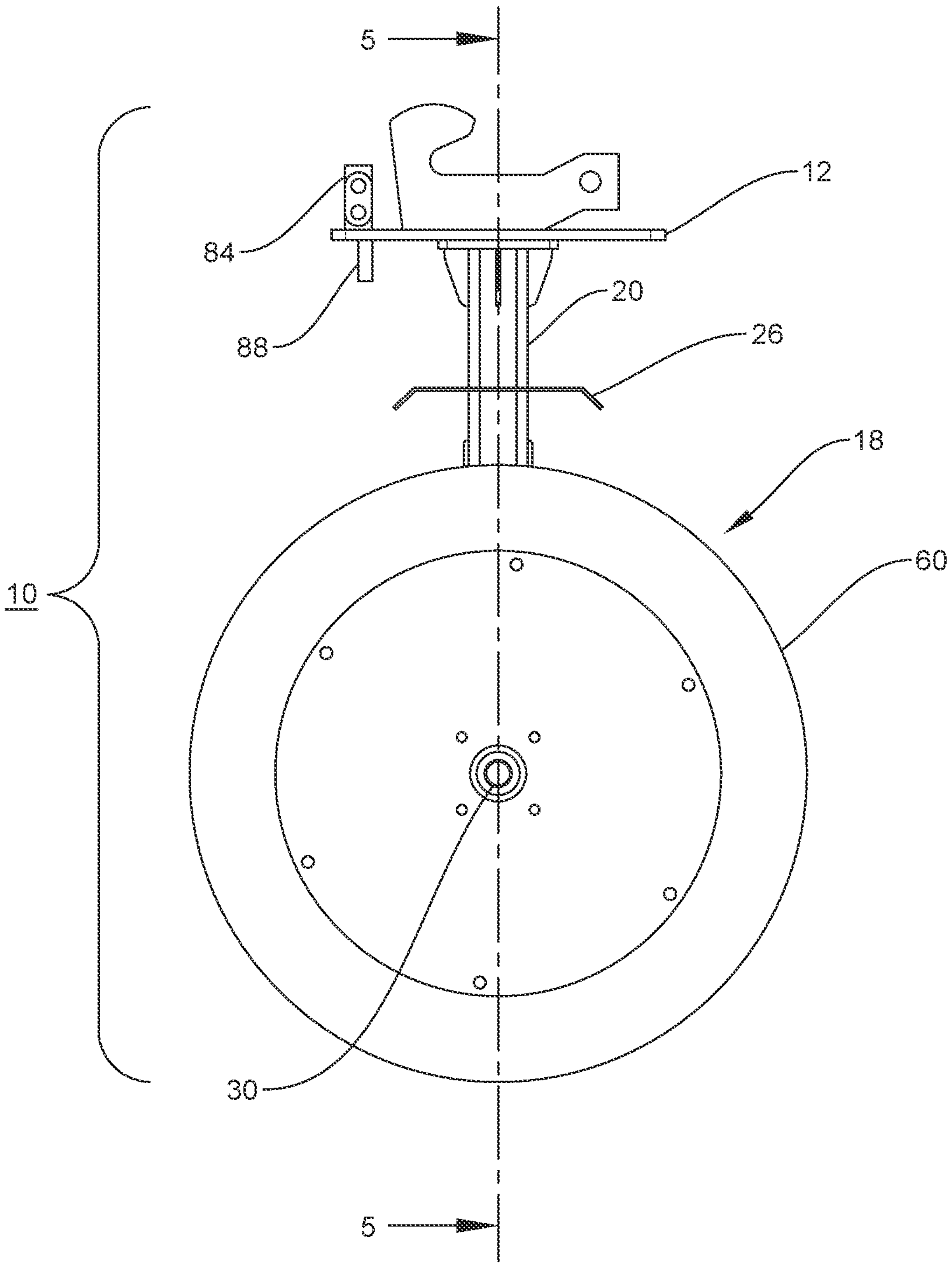
FIG. 2 is an end view thereof.

With continuing reference to FIGS. 1-4, a compaction roller 18 is supported on arms 20 from plate 12. Roller 18 is rotatable around a substantially horizontal axis of rotation and is divided into a plurality of independent rotatable sections or drums 22. In the embodiment best seen in FIG. 1, a center drum **22*a* is flanked by outer drums 22*b*. Drums 22 have a plurality of spaced apart cutters 24 projecting outwardly from the circumferential surface of the drums for compacting and pulverizing trash during rotation of roller 18. Ideally the configuration, dimensions and placement of cutters 24 is determined by the type of trash to be compacted and pulverized. Thus when the trash is building materials which may include metal, cutters 24 are preferably tetrahedral in order to provide the necessary strength. When the trash is of lesser structural strength such as cardboard or softer wood, cutters 24 are preferably triangular as shown in FIG. 1. When the trash is easily pulverized such as paper and plastic bags, cutters 24 be sharp planar projections or blades. An optional breaker plate 26 may be mounted on arms 20 above roller 18 as best seen in FIG. 2. An underside of breaker plate 26 may include knifes for removing and shredding material wedged on or stuck between cutters 24**.

Figure 10:
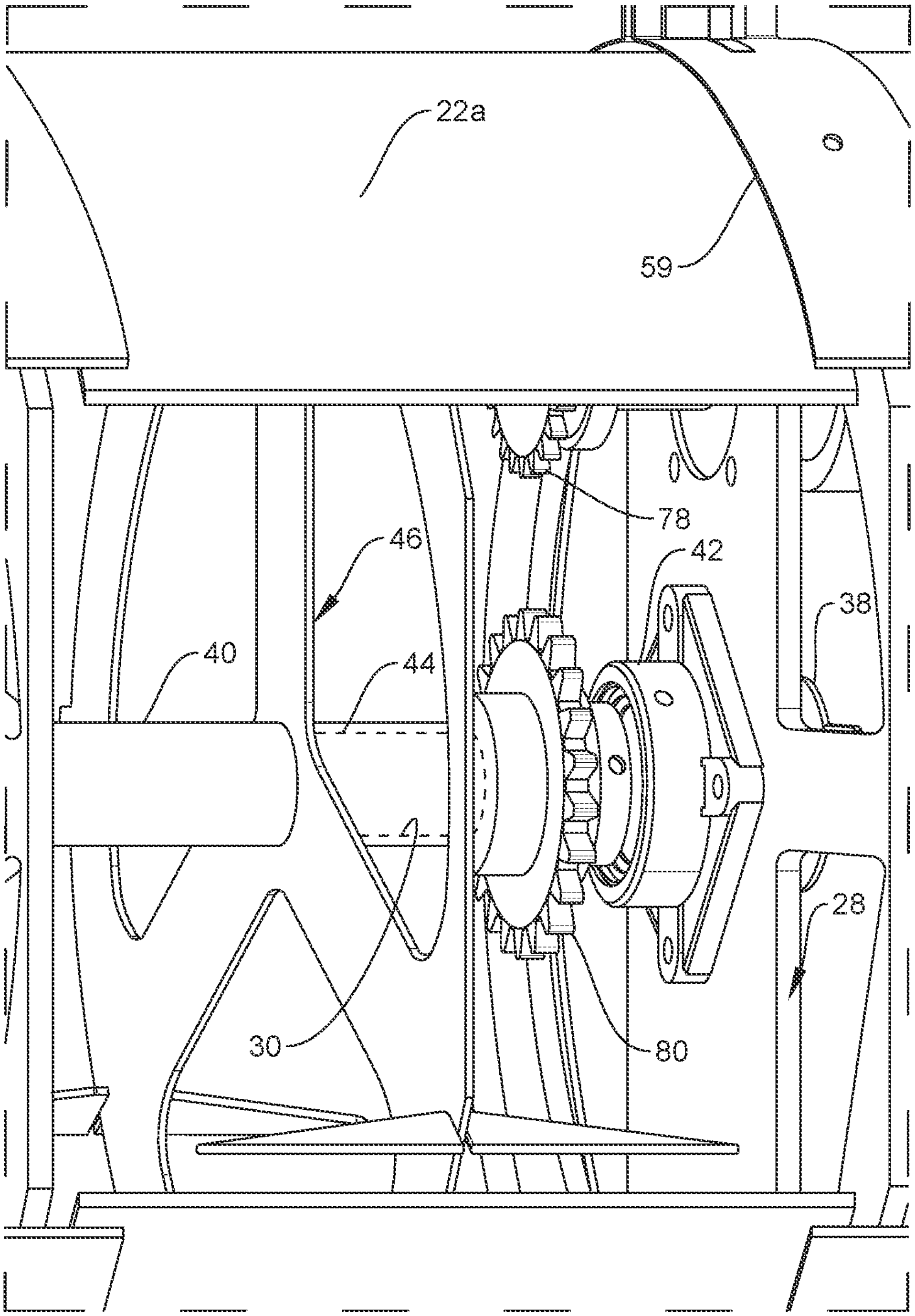
FIG. 10 is a detail taken along the line of 10-10 in FIG. 5.
Figure 11:
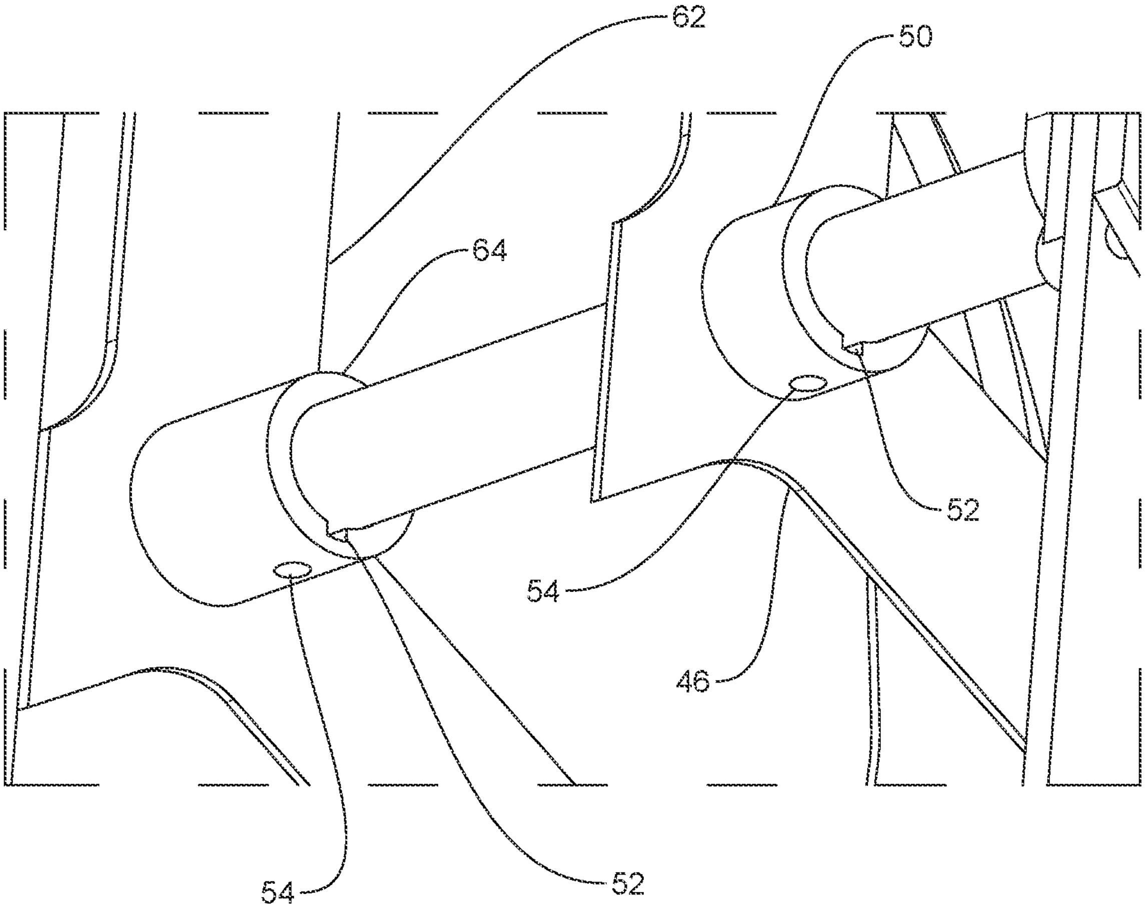
FIG. 11 is a detail taken along the line of 11-11 in FIG. 5.

Focusing next on FIGS. 5-11, compaction roller 18 includes first and second support discs 28 mounted on a main shaft 30 with center drum **22*a* mounted between the support discs and outer drums 22*b* flanking support discs 28. First and second support discs 28 are fixedly attached to arms 20 with a plate 32 upstanding from the support discs and received into a hollow section of arms 20. Each of support discs 28 includes a rim 34 mounted on spokes 36 with a central main axle support bearing 38 at the hub for main shaft 30. As shown in the drawings, support discs 28 have four segments with two of the spokes wide and in vertical alignment with plate 32 and arms 20. An over shaft 40 is mounted on main shaft 30 between support discs 28 and locked into an over shaft support bearing 42 at the hub of one of support discs 28. Over shaft 40 freely rotates on main shaft 30 in over shaft support bearing 42 on bushings 44 (FIG. 10**).

Each of drums 22 is mounted a drum support ring 46. Each drum support ring 46 includes a rim 48 mounted on spokes. The hub of the drum support ring 46 for center drum 22*b* is mounted on over shaft 40 for rotation therewith. In the case of outer drums 22*b* the hub of the drum support ring 46 is connected or integral with a collar 50 attached to main shaft 30. Collar 50 is detachably attached to main shaft 30 with a key and keyway arrangement 52 and set screws 54 (FIG. 11) for rotation with the main shaft. For attachment of drums 22, rim 48 of each drum support ring 46 includes a plurality of radial flats 56 between which are mounted triangular gussets 58 on which the cylindrical drum may be welded. A guard strip 59 is mounted on rim 34 of support discs 28 for bridging over and blocking the space between center drum 22*a* and outer drums 22*b*.

Figure 3:
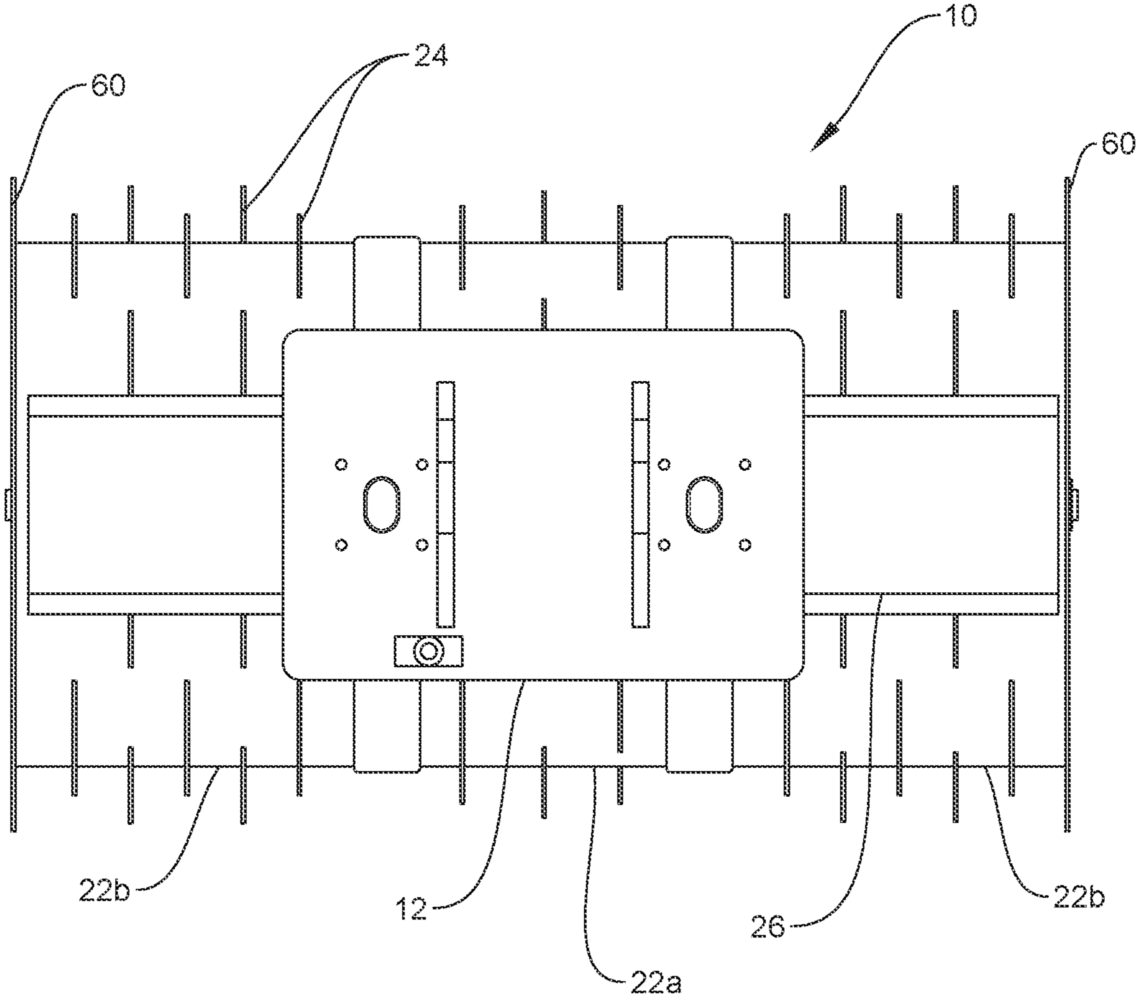
FIG. 3 is a top view thereof.
Figure 4:
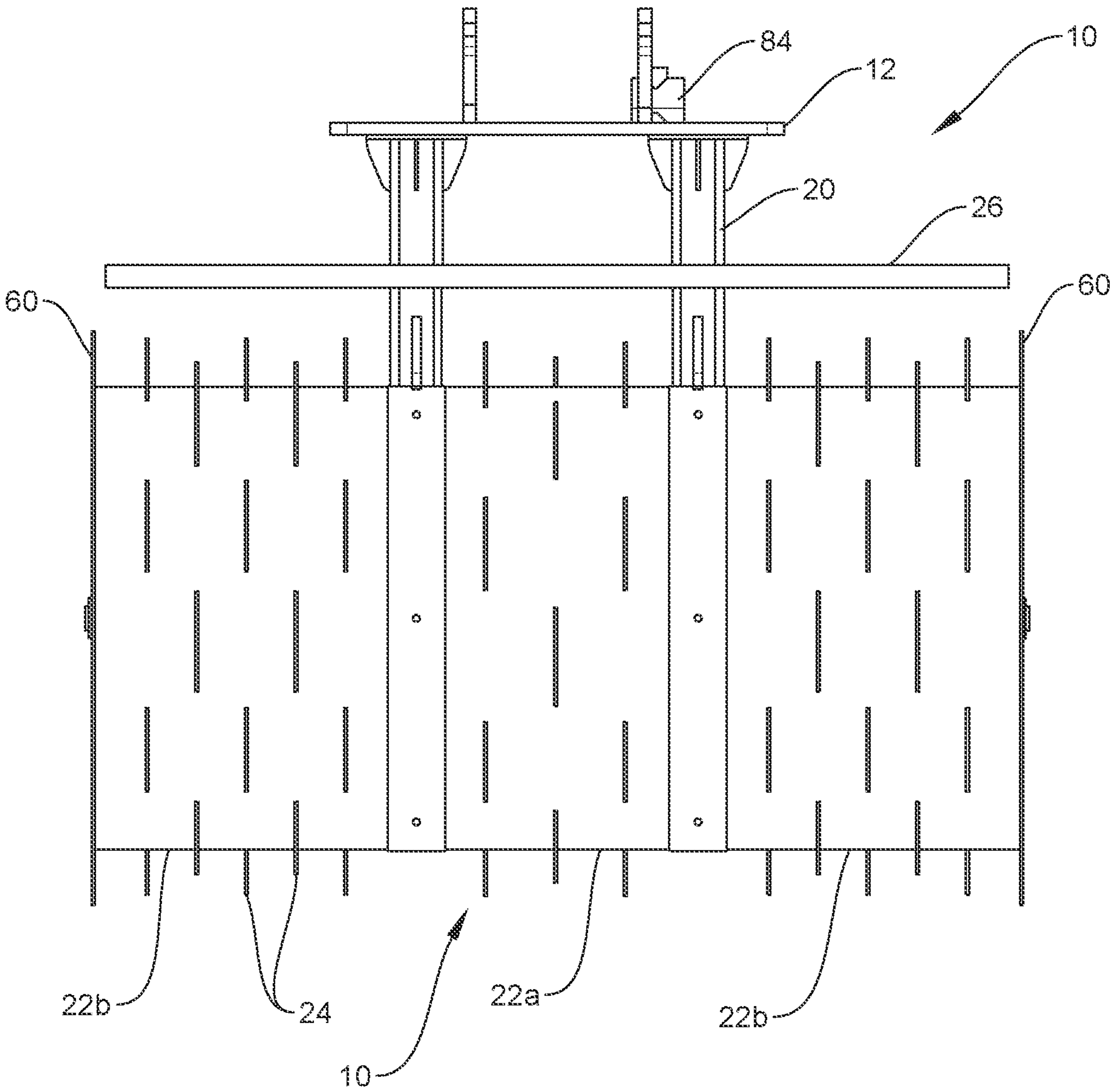
FIG. 4 is a front view thereof.
Figure 5:
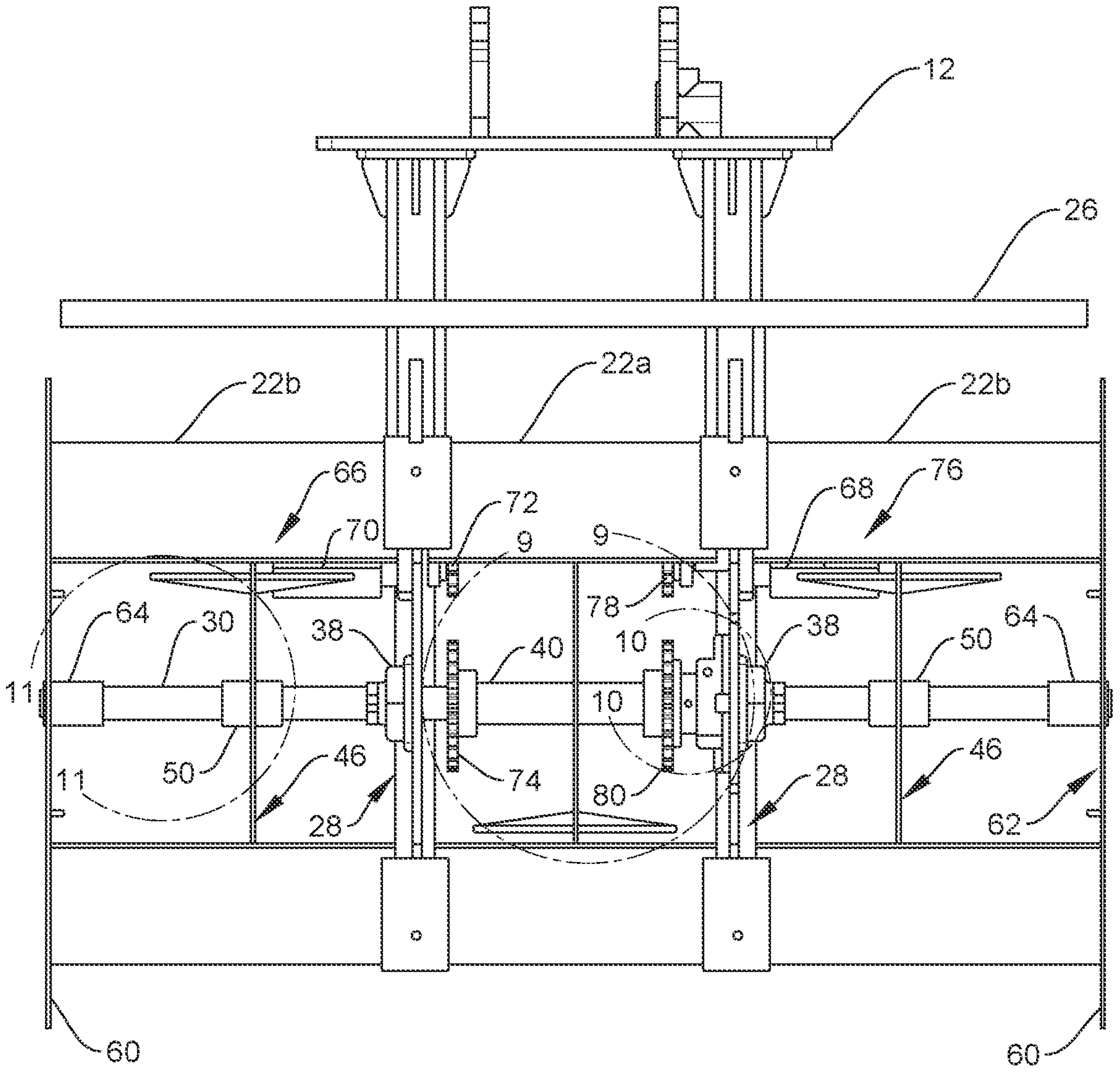
FIG. 5 is a cross sectional view taken along the plane of 5-5 in FIG. 2.
Figure 6:
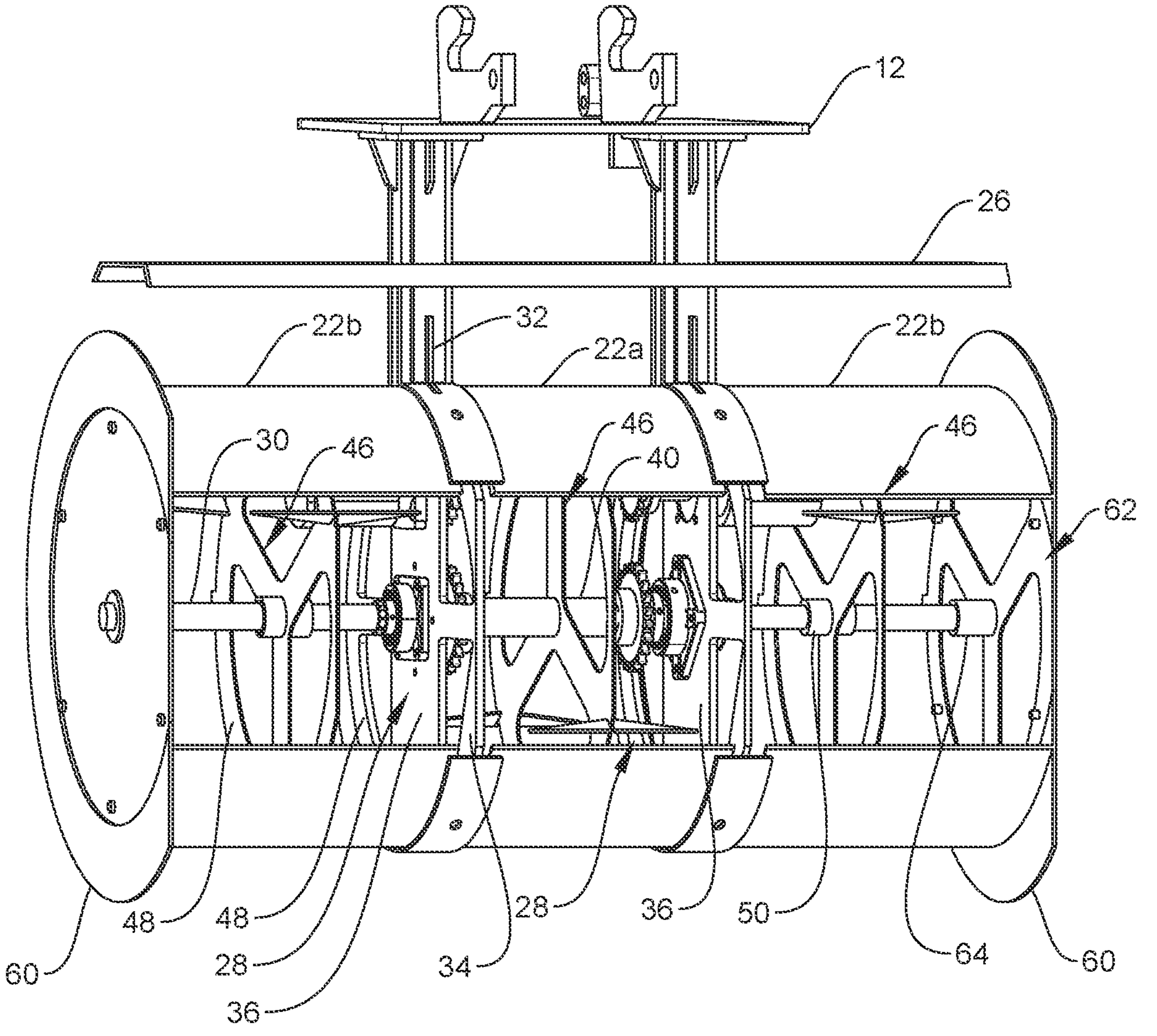
FIG. 6 is a perspective view with the drums partially open.
Figure 7:
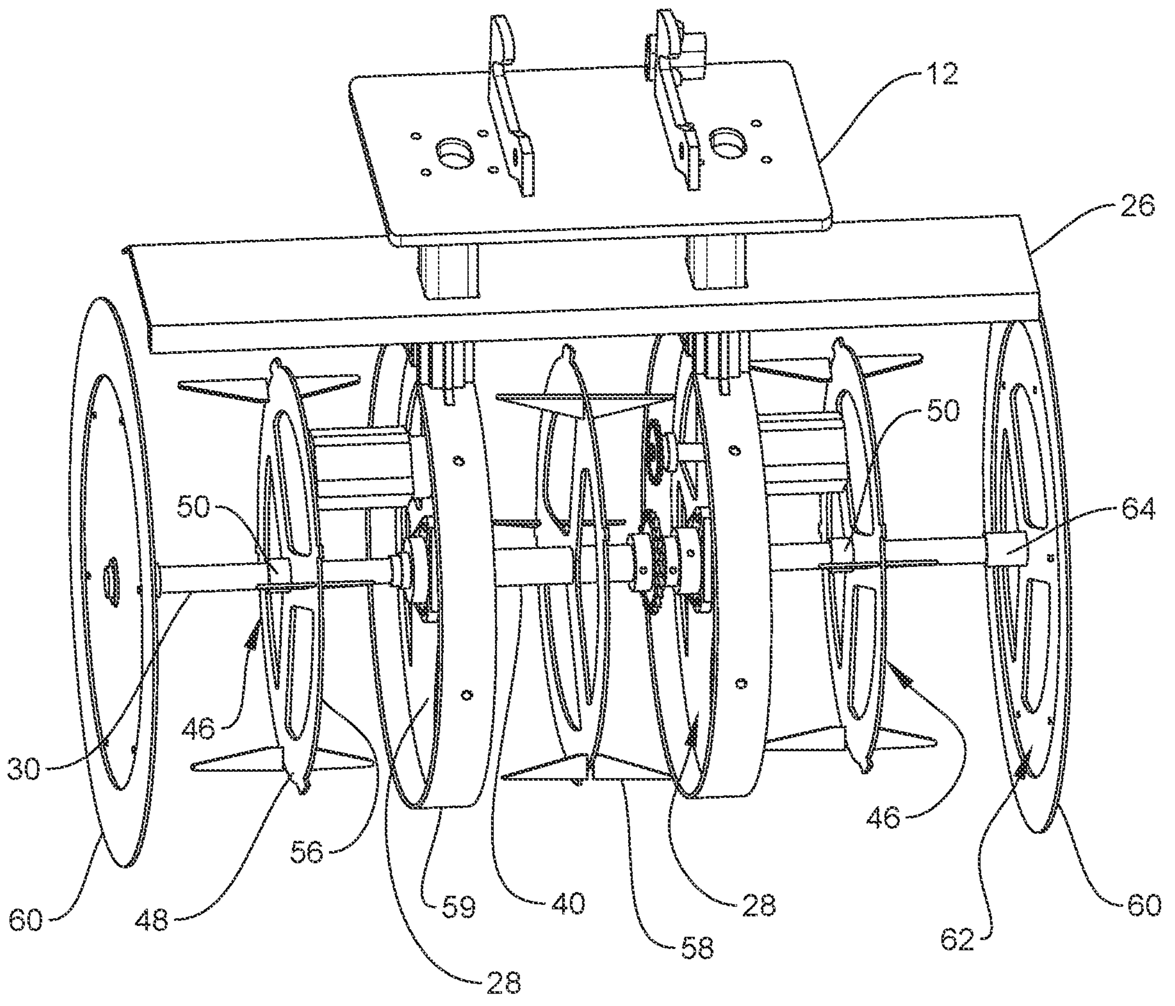
FIG. 7 is a perspective view with the drums removed.
Figure 8:
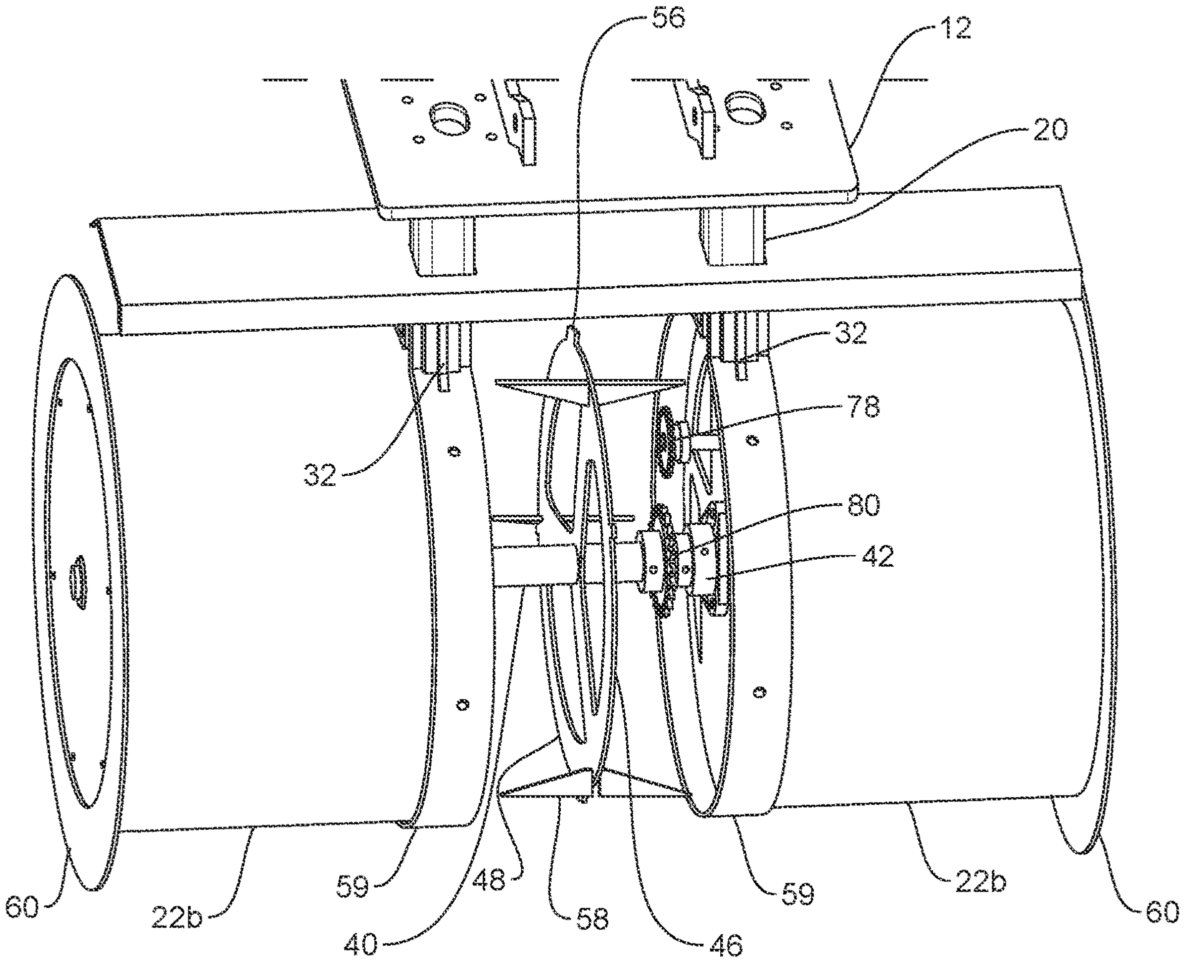
FIG. 8 is a perspective view with the center drum removed.
Figure 9:
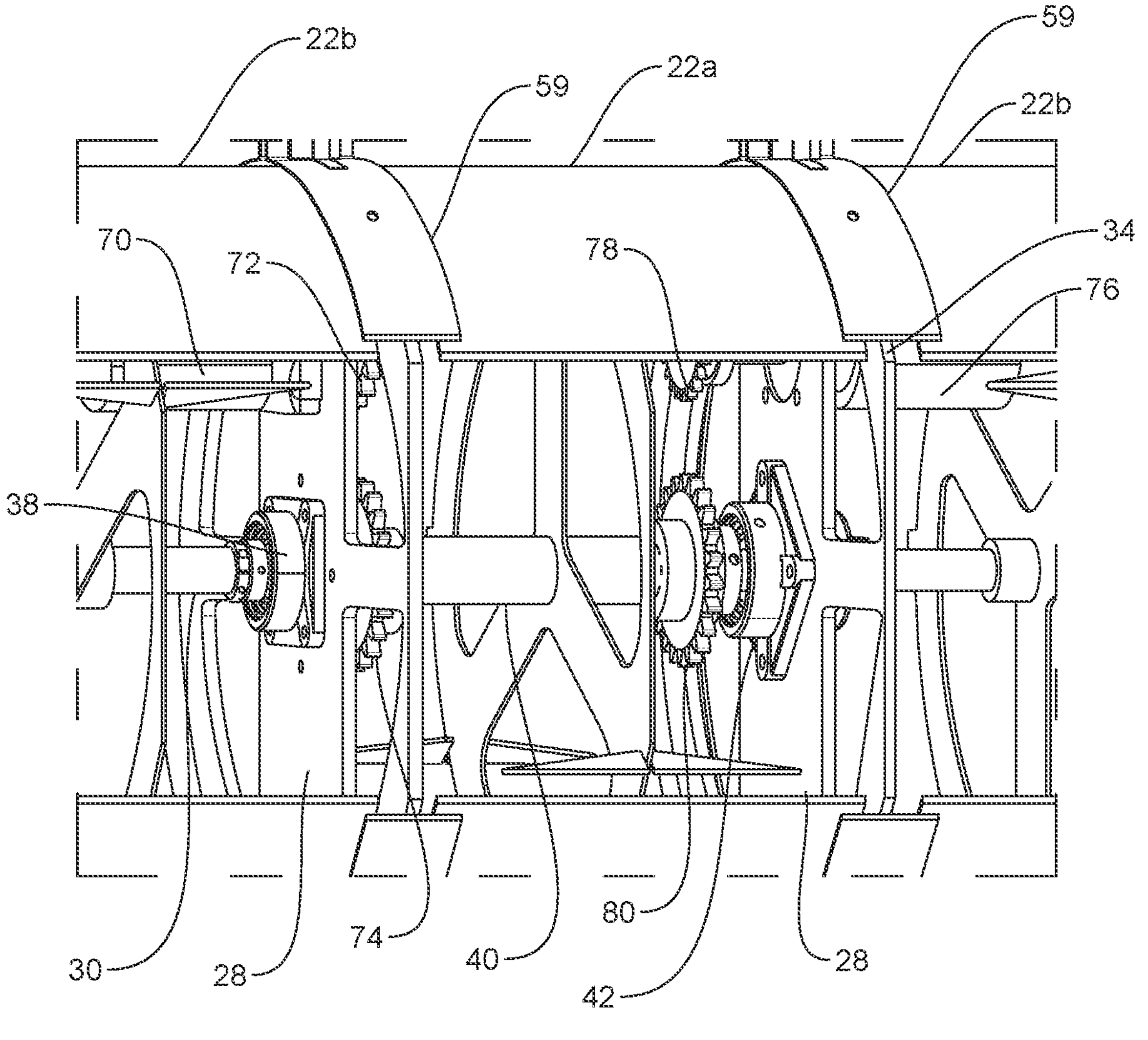
FIG. 9 is a detail taken along the line of 9-9 in FIG. 5.

First and second disc wheels 60 are provided at opposite ends of main shaft 30. Disc wheels 60 have a diameter larger than drums 22 (as seen in FIGS. 1 and 3-4) such that cutters 24 clear the surface over which roller moves and are not damaged. Each of disc wheels is mounted on a disc wheel support ring 62 attached to a collar 64 on main shaft 30. Disc wheel support ring 62 and attachment collar 64 may be similar in construction to drum support rings 46 and collar 50 described above. As shown, disc wheels 60 are bolted to disc wheel support rings 62 for ease of disassembly as described below.

Support discs 28, drum support rings 46 and disc support rings 62 may be formed from steel plates with apertures cut into the plates to form the rim, spokes and hub. As discussed below, apertures facilitate assembly and disassembly of the trash compactor and pulverizer 10 for maintenance and repair.

A first reversible drive 66 is provided for selectively rotating main shaft 30 and a second reversible drive 68 is provided for independently and selectively rotating over shaft 40. In the embodiment shown in the drawings, first reversible drive 66 comprises a drive train including a first hydraulic motor 66 with an output sprocket 72 connected with a drive chain or belt (not shown) or gear drive to a input sprocket 74 mounted on main shaft 30. Output sprocket 72 is smaller than input sprocket 74 such that main shaft 30 is rotated more slowly than the output shaft of the hydraulic motor but with higher torque. In a similar manner, second reversible drive 68 comprises a drive train including a second hydraulic motor 76 with an output sprocket 78 connected to an input sprocket 80 mounted on over shaft 40. A spacer may be provided on main shaft 30 between over shaft 40 and input sprocket 80.

Hydraulic fluid is supplied under pressure to motors 70, 76 from a pump drivingly associated with self-propelled vehicle 14. A manifold 84 is provided for independently supplying motors 70, 76 such that a driver in vehicle 14 can adjust the speed and direction of center section 22*a* and outer sections 22*b* independently.

The diameter and length of roller 18 is determined by the situation in which the roller is to be used. Typically an open top waste container has an exterior width of about 8 feet and a length of about 22 feet. Such that there is a clearance margin on each side, roller 18 has a length of about 6 feet, thereby leaving a foot of clearance as a margin on each end within the interior of the container. The roller shown in the drawings has disc wheels with a diameter of 45 inches, a drum diameter of 36 inches and weights about 1400 pounds but these details are illustrative and not limiting.

In use, self-propelled vehicle 14 may be driven to a location with an open top container. Boom 16 may then lift trash compactor and pulverizer 10 into the container and apply a downward force on roller 18. As a safety feature, a thermal imaging device and/or camera 88 may be provided to stop the operation if a person or the like is detected in the container.

An operator may cause compaction roller 18 held under pressure to move back and forth along the length of container 86. By changing the speed that drums 22*a*, 22*b* are rotated as well as the direction of rotation, the operator may accomplish maximum shredding. The user may stop roller 18 at any point in the dumpster. The operator may cause center drum 22*a* to rotate in a first direction while flanking drums 22*b* are rotated in an opposite direction to more effectively shred building materials such as wooden pallets, etc. As will be apparent from the above, trash compactor and pulverizer 10 may be driven to and used with a plurality of containers and compaction and pulverization efficiently performed without the driver getting out of the cab.

Maintenance of trash compactor and pulverizer 10 is facilitated by the apertures in support discs 28, drum support rings 46 and disc support rings 62 and collars 50 and 64. For example, the outer drum 22*b* on the left end as viewed in FIG. 5 may be removed as follows. Guard strip 59 is removed from the left support disc 28 and disc wheel 60 is unbolted from disc support ring 62. The operator may then reach through one of the apertures in disc support ring 62 and loosened both collars 64 and 50 allowing drum 22*b* to be slid off main axle 30. Main axle support bearing 38 is thus exposed and first reversible drive 66 may be accessed through apertures in support disc 28 for oiling and other repair and maintenance. In like manner main axle support bearing 38 and over shaft bearing 42 may be accessed by removing outer drum 22*b* on the right. Access to over shaft 40 may be accomplished by detaching one of arms 20 from support plate 12 and detaching main axle support bearing 38 and first reversible drive 66 from main axle 30.

As various changes could be made in the above constructions without departing from the scope of the invention, it is intended that all matter contained in the above description or shown in the accompanying drawings shall be interpreted as illustrative and not in a limiting sense.

What is claimed:

1. A compaction roller comprising first and second support discs mounted on a main shaft between which is mounted a inner drum flanked by first and second outer drums, each of said first and second outer drums mounted on a drum support ring which rotates with the main shaft, said main shaft capped at first and second ends with a disc wheel which rotates with the main shaft and which spaces the drums above a surface over which the roller is rolled, said inner drum mounted on an over shaft concentric with the main shaft and rotatable thereon, each of said inner and outer drums having a plurality of spaced apart cutters projecting outwardly from a circumferential surface of the drums, a reversible first drive attached to the main shaft and a reversible second drive attached to the over shaft, said first and second drives independently operable such that the outer drums and the inner drum are rotated in the same or opposite directions.

2. The compaction roller of claim 1, wherein each of the support discs and each of the drum support rings has a rim, spokes and a hub with apertures between the spokes.

3. The compaction roller of claim 2, wherein the main shaft passes through the hub of the support discs and through the hub of the drum support rings, said main shaft supported by a main shaft support bearing mounted on an outer side of the support discs and wherein the over shaft is supported by an over shaft support bearing on an inner side of one of the support discs.

4. The compaction roller of claim 2, wherein spaced apart flats and gussets are positioned on the rim of each of the support rings to which the first and second outer drums are welded.

5. The compaction roller of claim 2, wherein a collar attaches the hub of each of the drum support rings to the main shaft with a key and keyway and set screws.

6. A trash compactor and pulverizer with a compaction roller attached to a plate with first and second arms, said plate adapted to be mounted on a boom of a self-propelled vehicle capable of exerting a downward force on the roller and propelling the roller across trash to be compacted and pulverized, said roller comprising first and second support discs mounted on a main shaft between which is mounted a inner drum flanked by first and second outer drums, each of said first and second outer drums mounted on a drum support ring which rotates with the main shaft, said main shaft capped at first and second ends with a disc wheel which rotates with the main shaft and which spaces the drums above a surface over which the roller is rolled, said inner drum mounted on an over shaft concentric with the main shaft and rotatable thereon, each of said inner and outer drums having a plurality of spaced apart cutters projecting outwardly from a circumferential surface of the drums, a reversible first hydraulic motor attached to the main shaft with a sprocket drive and a reversible second hydraulic motor attached to the over shaft with a sprocket drive, said first and second hydraulic motors independently operable such that the outer drums and the inner drum are rotated in the same or opposite directions.

7. The trash compactor and pulverizer of claim 6, wherein each of the support discs and each of the drum support rings has a rim, spokes and a hub with apertures between the spokes.

8. The trash compactor and pulverizer of claim 7, wherein each of the first and second support discs has four apertures with two of the spokes in vertical alignment with the arms and connected to the arms with a plate received in a hollow section of the arms.

9. The trash compactor and pulverizer of claim 8, wherein a hydraulic fluid from the self-propelled vehicle is supplied through a manifold to the first and second hydraulic motors through the hollow section of the arms.

10. A trash compactor and pulverizer with a compaction roller attached to a plate with first and second arms, said plate adapted to be mounted on a boom of a self-propelled vehicle capable of exerting a downward force on the roller and propelling the roller across trash to be compacted and pulverized, a breaker plate mounted on the arms above the roller, said roller comprising first and second support discs mounted on a main shaft between which is mounted a inner drum flanked by first and second outer drums, each of said first and second outer drums mounted on a drum support ring which rotates with the main shaft, said main shaft capped at first and second ends with a disc wheel which rotates with the main shaft and which spaces the drums above a surface over which the roller is rolled, said inner drum mounted on an over shaft concentric with the main shaft and rotatable thereon, each of said inner and outer drums having a plurality of spaced apart cutters projecting outwardly from a circumferential surface of the drums, a reversible first hydraulic motor attached to the main shaft with a sprocket drive and a reversible second hydraulic motor attached to the over shaft with a sprocket drive, said first and second hydraulic motors independently operable such that the outer drums and the inner drum are rotated in the same or opposite directions.

11. The trash compactor and pulverizer of claim 10, wherein each of the disc wheels is mounted on a disc wheel support ring attached to the main shaft.

12. The trash compactor and pulverized of claim 11, wherein each of the support discs, each of the drum support rings and each of the disc wheel support rings has a rim, spokes and a hub with aperture between the spokes.

13. The trash compactor and pulverizer of claim 12, wherein the first support disc has four apertures with two of the spokes in a vertical alignment with the first arm and connected to the first arm with a plate received in a hollow section of the first arm; and wherein the second support disc has four apertures with two of the spokes in a vertical alignment with the second arm and connected to the second arm with a plate received in a hollow section of the second arm.

14. The trash compactor and pulverizer of claim 11, with a guard strip mounted on the rim of each of the support discs bridging over and blocking a space between the inner drum and the outer drums.

15. The trash compactor and pulverizer of claim 10, wherein a thermal imaging device or a camera is attached to the plate.

* * * * *